INVENTORS
E. U. COHLER
T. W. LAWLESS
G. T. BARRETT
BY F. W. Sullivan
ATTORNEY

Nov. 26, 1963 E. U. COHLER ETAL 3,112,476

ELECTRONIC SWITCHES

Filed Jan. 7, 1960 2 Sheets-Sheet 2

INVENTORS
E.U. COHLER
T.W. LAWLESS
G.T. BARRETT
BY F. I. Sullivan
ATTORNEY 3,112,476

ELECTRONIC SWITCHES

Edmund U. Cohler, Brookline, George T. Barrett, Woburn, and Thomas W. Lawless, Milton, Mass., assignors to Sylvania Electric Products Inc., a corporation of Delaware Filed Jan. 7, 1960, Ser. No. 1,045
6 Claims. (Cl. 340—258)

Figure 1:
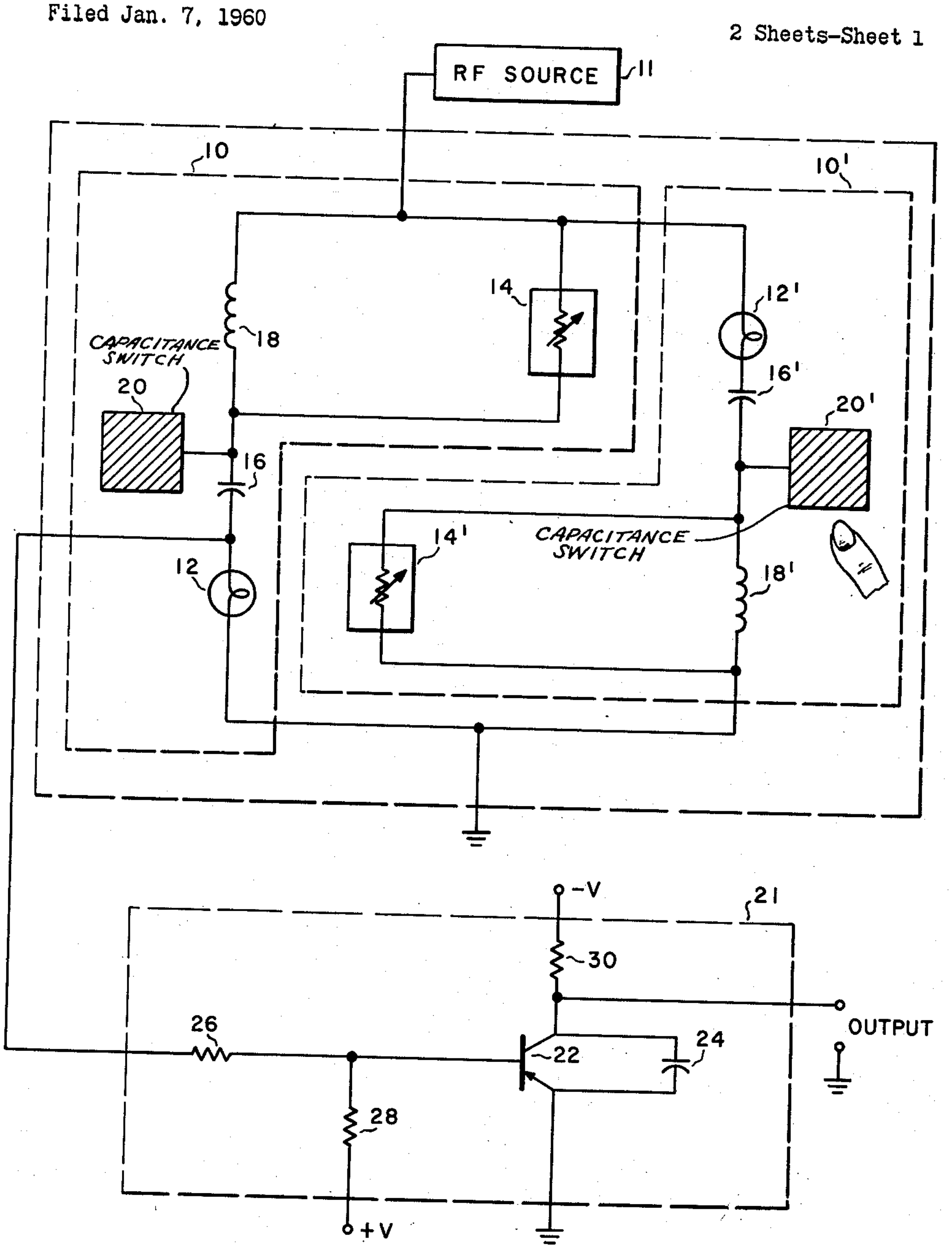

This invention is concerned with electrical systems and particularly with switches useful, for example, on the operator's console of electronic data processing equipment.

In complex electronic systems such as computers, banks of switches on the operator's console or at other convenient locations are utilized for such purposes as manual adjustment and correction, or insertion, of data into the system and for controlling or initiating various phases of the operation of the equipment. In a typical installation rows of lights may be arranged in banks to indicate the content or condition of each individual stage in the various component registers of the system and separate switches are provided for inserting into each stage of each register the Zero or One of a binary code. Since each register generally corresponds in number of stages to the length of the system data processing word (a typical example is thirty-eight bits) and a separate light is used to indicate the Zero and the One condition of each stage in each register, several hundred lights may be employed on a single console and an equal number of switch contacts must be provided to control the condition indicated by each of the different lights.

It has been the practice to use toggles, pushbuttons, and other mechanical switching devices in combination with indicator display lamps for this purpose. Such switches, however, have several shortcomings. Because their contacts have opening and closing times in the millisecond range and are subject to millisecond periods of "bounce" while the equipment may operate in microsecond cycles, it is sometimes necessary to add a delay element to portions of the circuitry to prevent a series of microsecond operations from occurring while the contacts of a closed switch are still open or in a "bounce" condition. Moreover, mechanical moving parts are prone to wear and failure and the contacts of multipole mechanical switches do not always open and close in the same sequence. Also, a failure or malfunction of a switch, its associated indicator, or the connection between them, may result in misinformation.

Accordingly, a primary object of the present invention is to provide an improved electronic switch-display combination. Another object is to provide an electronic switch having no electro-mechanical or mechanical component parts. A more specific object is to provide improved means for the control of electronic circuits, utilizing bistable devices operable by contact between a human finger and a dielectric disc, closely associated with adequate display means to indicate the state of the device and to provide an improved means for inserting binary data.

These and related objects are accomplished in one embodiment of the invention by equipping two coacting stable circuits each with an indicator bulb and a dielectric disc sensitive to body capacity to provide a self-indicating flip-flop which may be switched from one bistable condition to another by the momentary addition to the appropriate circuit of body capacity as represented by the operator's finger touching one of the indicator bulbs.

Figure 2:
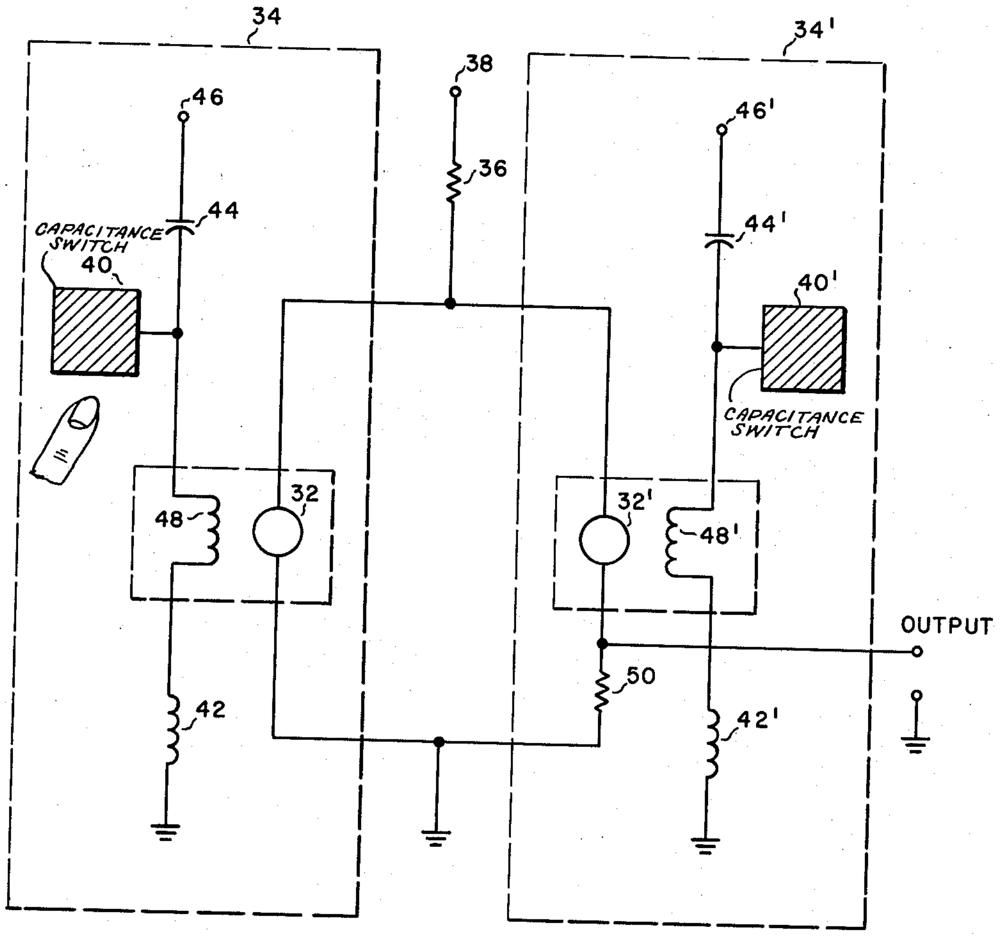

Other objects, features, and modifications of the invention will be apparent from the following, more detailed description of this illustrative embodiment and reference to the accompanying figures, wherein:

FIG. 1 is a schematic representation of an electronic switch and indicator combination embodying one modification of the invention; and FIG. 2 is a similar representation of another modification of the invention.

In FIG. 1, an electronic switch comprised of coacting bistable circuitry includes two electronically similar and interconnected tuned circuits 10, 10′ having a common R.F. voltage source 11 which operates at such frequency that the inductive and capacitive elements of the tuned circuits my be small in size and a sufficient detuning effect can be realized from the addition of human body capacity as represented by the operator's finger. Each of the two circuits includes an indicator bulb 12, 12′ whose relative brilliance determines the resistive effect of a photocell 14, 14′. A capacitance 16, 16′ and an inductance 18, 18′ respectively series tune each of the circuits; and, metal discs 20, 20′ coated with a dielectric material are connected between the inductances 18, 18′ and the capacitances 16, 16′ respectively.

The operation of the tuned circuits 10, 10′ as a switch is analogous to the bistable operation of a flip-flop. When a voltage of approximately the same frequency to which the circuits 10, 10′ are tuned is applied from R.F. source 11, both bulbs 12, 12′ begin to light. Because of a slight difference, however, in the resonant frequency of the tuned circuits 10, 10′, one circuit will be peaked closer to the supply frequency and tend to allow its bulb 12, 12′ to illuminate before the corresponding bulb of the other circuit. If the circuit containing inductor 18, capacitor 16, and bulb 12 is arbitrarily chosen to be the circuit tuned more closely to the frequency of the applied signal, bulb 12 will be preferred for illumination. Since bulb 12 is optically connected to photoconductor 14′, it will, when illuminated, lower the resistance of the photoconductor considerably and detune the circuit comprising inductor 18′, capacitor 16′, and bulb 12′. This detuned circuit thus becomes a high impedance and prevents bulb 12′ from reaching a luminous state.

The switch is now in one of its two stable conditions and remains in such condition until body capacity is applied to disc 20. When disc 20 is touched, the body capacity of the operator detunes the circuit comprising inductor 18, capacitor 16, and bulb 12 causing it to provide a sufficiently high impedance to extinguish bulb 12. Without the light of bulb 12, the photoconductor 14′ returns to a high resistance condition and the sensitivity of the series circuit composed of inductor 18′, capacitor 16′, and bulb 12′ to the supply frequency is restored. With this circuit thus tuned, bulb 12′ illuminates and the resistance of photoconductor 14 to which it is optically connected is decreased sufficiently to hold the circuit comprising inductor 18, capacitor 16, and bulb 12 detuned even when the body capacity of the operator's finger is removed from disc 20. Bulb 12′ is now illuminated and bulb 12 is extinguished. Similarly, the situation may be reversed by an operator's touch of disc 20′.

In a practical embodiment, the disc 20 may be physically located proximate the bulb 12′ and disc 20′ proximate bulb 12. Thus, touching the unlit bulb will switch the circuit, extinguish the previously illuminated bulb and light the one touched.

This bistable indicator circuit may be used to perform a switching function in the manner demonstrated by the circuit 21 of FIG. 1. Here, voltages developed across bulb 12 are utilized to represent "on" and "off" states which may correspond to One and Zero indications of a binary coded data processing system. These R.M.S. voltages are sine waves and must be rectified and filtered before they are used. Rectification is accomplished by transistor 22 and filtering is accomplished by capacitor 24. Since the transistor is of the PNP variety, it responds only to the negative portion of the signal across bulb 12. The collector voltage, which also tends to change at a rate consistent with the source frequency, is held during the off period of the transistor due to the time constant of capacitor 24 and resistor 30.

The quiescent level required by the external load is approximately ground. This corresponds to the "off" condition of the switch and saturation of transistor 22. The "on" condition of the switch is such as to provide insufficient drive to overcome the "off" bias of transistor 22 so its collector voltage remains unloaded (negative).

The switch of FIG. 1 may be operated with several satisfactory combinations of components. One particular operative combination is as follows:

| | |
|---|---|
| R.F. source 11 | 2 megacycles. |
| Bulbs 12 | GE–345. |
| Photoconductors 14 | Clairex CL–3. |
| Capacitors 16 | 47 $\mu\mu$f. |
| Inductors 18 | 120 $\mu$h. |
| Discs 20 | Electrical conductive metal coated with paint or other dielectric material. |
| Transistor 22 | CT–764. |
| Capacitor 24 | 15 $\mu$f. |
| Resistor 26 | 14K. |
| Resistor 28 | 19K. |
| Resistor 30 | 390Ω. |

An alternative embodiment of the invention is shown in FIG. 2. Here, the indicator elements are neon bulbs 32, 32′ in two series resonant circuits 34, 34′. The bulbs 32, 32′ are connected through a resistor 36 to a common D.C. voltage supply 38 and their respective resonant circuits include: metal discs 40, 40′ coated with a dielectric material; inductors 42, 42′; capacitors 44, 44′; A.F. voltage sources 46, 46′ which operate at slightly below the frequency to which the circuits 34, 34′ are tuned; and, trigger coils 48, 48′ proximate the bulbs 32, 32′ respectively.

A high impedance exists in each circuit 34, 34′ until body capacity, as represented by the operator's finger touching a disc 40, 40′, is applied thereby decreasing its resonant frequency to that of the voltage applied at its terminal 46, 46′. When one of the circuits is thus tuned a larger current flows in it and a stronger field is produced by its trigger coil 48, 48′ which may be wound around its respective bulb 32, 32′.

The field produced by these coils 48, 48′ has an ionizing effect on the neon gas content and controls the firing point of the D.C. voltage across, each bulb 32, 32′. Also, coil 48 has a few more turns than 48′. Consequently, bulb 32 has an effectively lower firing point than bulb 32′ when both resonant circuits are free from body capacity. Thus, when the D.C. voltage supply 38 is applied to the neon bulb circuit, bulb 32 fires first and draws sufficient current through resistor 36 to keep the voltage across bulb 32′ below its firing point.

The switch is now in one of its stable states and remains in this condition until, by the touch of the operator's finger, body capacity is applied to disc 40′. This added capacity tunes the circuit comprised of capacitor 44′ and inductor 42′ to the applied frequency and causes an increase in current through coil 48′. This current produces a field of sufficient strength to ignite the bulb 32′ which then draws sufficient current through resistor 36 to drop the voltage across bulb 32 and extinguish it. Thus, the switch is changed from one bistable condition to another; and it may be returned to the original condition by an operator's touch of disc 40.

Voltage signals representing "on" and "off" condititon may be obtained across resistor 50 as a function of the conducting or non-conducting condition of the bulb 32′.

An operative combination for the circuit of FIG. 2 is as follows:

| | |
|---|---|
| Indicators 32, 32′ | NE2. |
| R36 | 47K. |
| Potential at 38 | 80 volts D.C. |
| Disc 40, 40′ | Conductive metal coated with paint or other dielectric material. |
| Inductance 42, 42′ | 120 $\mu$h. |
| Capacitors 44, 44′ | ARCO 462. |
| Signal at terminals 46, 46′ | 2 megacycles. |
| Coil 48 | 6 turns. |
| Coil 48′ | 4 turns. |
| R50 | 2.2K. |

A 15 m.f.d. 20 volt filtering capacitor may be connected across the output.

The invention is not limited to the specific embodiments, modifications or circuits shown and described but includes the full scope of the following claims.

What is claimed is:

1. A bistable electronic switch comprising, first and second indicating elements connected to a common source of electrical energy and operative when energized by current from said source to produce a visual indication, first and second series-resonant circuits coupled to said first and second indicating elements, respectively, and each being operative when tuned to a given frequency to cause its respective indicating element to be energized, first and second capacitor plates respectively connected to said first and second series-resonant circuits and operative in response to exposure to the capacitive effect of touch by a human finger to tune its respective resonant circuit to a frequency different from the frequency at which it is tuned when said capacitive effect is absent, and means intercoupling said first and second indicating elements with said second and first series-resonant circuits, respectively, and operative in response to the energization of the indicating element coupled to one of said series-resonant circuits to prevent energization of the indicating element coupled to the other of said circuits.

2. A bistable electronic switch comprising, first and second indicating elements operative when energized to produce a visual indication, first and second series-resonant circuits respectively including said first and second indicating elements connected to a common source of radio frequency energy of given frequency, said first and second circuits being operative when tuned to said given frequency to cause its respective indicating element to be energibed by current from said source, first and second capacitor plates respectively connected to said first and second circuits and operative in response to exposure to the capacitance effect of touch by a human finger to tune its respective resonant circuit to a frequency differing from said given frequency, and means intercoupling said first and second indicating elements with said second and first circuits, respectively, and operative in response to the energization of the indicating element in one of said circuits to detune the other of said circuits from said given frequency.

3. A bistable electronic switch comprising, a source of radio frequency energy of given frequency, first and second series-resonant circuits connected to said source and each including an inductor, a capacitor and a visually radiant indicating element in series connection and a photoconductive element connected in parallel with the inductor, said first and second circuits being operative when tuned to said given frequency to cause its respective indicating element to be energized by current from said source to provide a visual indication, and first and second capacitor plates connected to the junction of the capacitor and the inductor of said first and second circuits, respectively, and operative in response to exposure to the capacitive effect of touch by a human finger to detune its respective circuit from said given frequency, said photo-conductive elements in said first and second circuits being optically intercoupled with the indicating elements of said second and first circuits, respectively, and operative in response to the energization of the indicating element in one of said circuits to detune the other of said circuits from said given frequency.

4. A bistable electronic switch comprising, a source of radio frequency energy of given frequency, first and second series-resonant circuits connected in parallel to said source and each including an inductor, a capacitor and a lamp in series connection and a photo-conductive element connected in parallel with the inductor, said first and second circuits each being resonant at said given frequency and operative when tuned to resonance to cause sufficient current to flow therein to illuminate its respective lamp, and first and second capacitor plates connected to the junction of the capacitor and the inductor of said first and second circuits, respectively, and operative in response to exposure to the capacitance effect of touch by a human finger to detune its respective circuit from resonance, said photo-conductive elements in said first and second circuits being optically coupled with the lamp of said second and first circuit, respectively and operative in response to the illumination of the lamp in one of said circuits to effectively short the inductor in the other of said circuits thereby detuning it from resonance.

5. A bistable electronic switch comprising, first and second ionizable indicating lamps, circuit means connecting said first and second lamps in parallel and to a common source of voltage, said lamps having a firing potential below the potential of said common source of voltage, first and second series-resonant circuits respectively connected to first and second sources of radio frequency energy, said first and second circuits each including a trigger coil coupled to said first and second lamps, respectively, and operative in response to the flow therethrough of current of a predetermined magnitude to ionize its respective lamp to cause firing thereof upon application thereto of a potential in excess of its firing potential, said first and second circuits being resonant at a frequency different from the frequency of its respective radio frequency source, and first and second capacitor plates respectively connected to said first and second circuits and operative in response to exposure to the capacitive effect of touch by a human finger to tune its respective circuit to the frequency of its respective radio frequency source to thereby cause current of said predetermined magnitude to flow through its trigger coil and a corresponding lamp to be fired, said circuit means including a resistor connected in series between said parallel-connected lamps and said common source of voltage of a value to reduce the potential applied to one of said lamps below its firing potential in response to the current flow through said resistor after the other of said lamps has been fired.

6. A bistable electronic switch comprising, first and second ionizable indicating lamps having a predetermined firing potential, a source of direct current voltage having a potential in excess of said predetermined firing potential, circuit means connecting said first and second lamps in parallel and to said source of voltage, first and second series-resonant circuits respectively connected to first and second radio frequency sources of the same given frequency, said first and second circuits each including a capacitor and a trigger coil in series connection, said trigger coils being coupled to said first and second lamps, respectively, and operative in response to the flow therethrough of current of a predetermined magnitude to ionize its respective lamp to cause firing thereof upon application thereto of a potential in excess of said predetermined firing potential, said first and second circuits being resonant at a frequency different from said given frequency, and first and second capacitor plates respectively connected to said first and second circuits and operative in response to exposure to the capacitive effect of touch by a human finger to tune its respective circuit to said given frequency and cause current of said predetermined magnitude to flow through its trigger coil and a corresponding lamp to be fired, said first-mentioned circuit means including a resistor connected between said voltage source and said parallel-connected lamps of a value to reduce the potential applied to one of said lamps below said predetermined firing potential in response to the current flow through said resistor after the other of said lamps has been fired.

References Cited in the file of this patent

UNITED STATES PATENTS

| | | |
|---|---|---|
| 2,743,433 | Parmet | Apr. 24, 1956 |
| 2,782,406 | Krakora | Feb. 19, 1957 |
| 2,922,880 | Elam | Jan. 26, 1960 |
| 2,930,907 | Slobodzinski | Mar. 29, 1960 |

FOREIGN PATENTS

| | | |
|---|---|---|
| 823,819 | Great Britain | Nov. 18, 1959 |